(12) United States Patent     (10) Patent No.:   US 12,669,698 B2

Nishimura et al.     (45) Date of Patent:    Jun. 30, 2026

---

(54) BEAM, SWINGING ELEMENT, AND OPTICAL SCANNING APPARATUS

(71) Applicant: HOKUYO AUTOMATIC CO., LTD., Osaka (JP)

(72) Inventors: Kentaro Nishimura, Osaka (JP); Yoko Awata, Osaka (JP); Naoki Chatani, Osaka (JP)

(73) Assignee: HOKUYO AUTOMATIC CO., LTD., Osaka (JP)

( * ) Notice: Subject to any disclaimer, the term of this patent is extended or adjusted under 35 U.S.C. 154(b) by 217 days.

(21) Appl. No.: 18/728,687

(22) PCT Filed: Jan. 12, 2023

(86) PCT No.: PCT/JP2023/000527

§ 371 (c)(1),
(2) Date: Jul. 12, 2024

(87) PCT Pub. No.: WO2023/136271

PCT Pub. Date: Jul. 20, 2023

(65) Prior Publication Data

US 2025/0123479 A1    Apr. 17, 2025

(30) Foreign Application Priority Data

Jan. 14, 2022   (JP) ................................. 2022-004361

(51) Int. Cl.
*G02B 26/10*      (2006.01)
*G02B 26/08*      (2006.01)

(52) U.S. Cl.
CPC ......... *G02B 26/105* (2013.01); *G02B 26/085* (2013.01)

(58) Field of Classification Search
CPC ............................ G02B 26/105; G02B 26/085
See application file for complete search history.

(56) References Cited

U.S. PATENT DOCUMENTS 5,966,009 A    10/1999   Asada
2007/0064299 A1*   3/2007   Dewa ................... G02B 26/085
                                   359/291

(Continued)

FOREIGN PATENT DOCUMENTS

CN       210222357 U     3/2020
JP       H08-186975 A    7/1996

(Continued)

OTHER PUBLICATIONS

Mar. 28, 2023 Search Report issued in International Patent Application No. PCT/JP2023/000527.

*Primary Examiner* — James A Dudek
(74) *Attorney, Agent, or Firm* — Oliff PLC

(57)             ABSTRACT

A beam includes a base connecting part to be connected to a base substrate, a coil connecting part to be connected to a coil substrate, and a beam part coupling the base connecting part to the coil connecting part. At least one of the base connecting part and the coil connecting part has a soldering part to be soldered to the base substrate or the coil substrate, and the soldering part includes a first connecting part and a second connecting part adjacent to the first connecting part, and when a direction in which the first connecting part and the second connecting part are adjacent to each other is defined as an adjacent direction, a cross-section of the first connecting part orthogonal to the adjacent direction is smaller in area than a cross-section of the second connecting part orthogonal to the adjacent direction.

11 Claims, 8 Drawing Sheets

(56)           References Cited

U.S. PATENT DOCUMENTS

| | | |
|---|---|---|
| 2008/0285107 A1 | 11/2008 | Asada et al. |
| 2010/0014143 A1 | 1/2010 | Kanno et al. |
| 2014/0016169 A1 | 1/2014 | Abele et al. |
| 2014/0132187 A1 | 5/2014 | Mori et al. |

FOREIGN PATENT DOCUMENTS

| | | |
|---|---|---|
| JP | 2008-040228 A | 2/2008 |
| JP | 2010-026069 A | 2/2010 |
| JP | 2014-095837 A | 5/2014 |
| WO | 2012/130612 A1 | 10/2012 |

* cited by examiner (a)

(b)

(c)

(a)

(b)

(c)

(d)

BEAM, SWINGING ELEMENT, AND OPTICAL SCANNING APPARATUS

TECHNICAL FIELD

The present invention relates to a beam, a swinging element, and an optical scanning apparatus.

BACKGROUND ART

Conventionally, in distance measuring apparatuses and the like, an optical scanning apparatus that changes the direction of travel of light by reflecting light from a light source with a mirror is utilized in order to scan light. Also, conventionally, in such optical scanning apparatuses, an electromagnetic drive element that uses a Lorentz force generated when an electric current is passed through a magnetic field is utilized in order to swing the mirror.

For example, a miniature machine disclosed in Patent Document 1 includes a movable part, a fixing part, a pair of beam parts that support the movable part with the fixing part, and a pair of permanent magnets. The movable part includes a deflection mirror and a coil substrate.

In the above miniature machine, when an alternating current is applied to a coil formed on the coil substrate from pins provided in the fixing part via the beam parts, a Lorentz force is generated by the alternating current and the magnetic field formed by the permanent magnets. The movable part swings due to this Lorentz force. That is, the deflection mirror swings. The direction of travel of light reflected by the deflection mirror can thereby be changed.

LIST OF RELATED ART DOCUMENTS

Patent Document

Patent Document 1: Japanese Patent Laid-Open Publication No. 2014-95837

SUMMARY OF INVENTION

Problems to be Solved by the Invention

As described above, in the miniature machine of Patent Document 1, a current is supplied to the coil substrate from the pins of the fixing part via the beam parts. That is, in the miniature machine of Patent Document 1, the beam parts that swingably support the mirror also function to supply the current. In a conventional apparatus having such a configuration, the beams for swinging the mirror need to be fixed to a substrate (coil substrate and fixing part in the miniature machine of Patent Document 1) by a conductive adhesive.

However, the adhesive strength of adhesion using a conductive adhesive tends to be weak, compared to adhesion using a normal adhesive. Also, when the beams are adhered to the substrate with an adhesive, shortening the manufacturing time is difficult, because it is impossible to move onto the next process until the adhesive has hardened.

In view of this, an example object of the present invention is to provide a beam that can be fixed to a substrate in a short time and with sufficient strength, a swinging element provided with the beam, and an optical scanning apparatus.

Means for Solving the Problems (1) In order to achieve the above object, a beam in one aspect of the present invention is a beam for connecting a base substrate and a coil substrate to each other and supplying a current for swinging the coil substrate from the base substrate to the coil substrate in a swinging element for swinging a mirror that reflects light in an optical scanning apparatus, the beam including a base connecting part to be connected to the base substrate, a coil connecting part to be connected to the coil substrate, and a beam part coupling the base connecting part to the coil connecting part, at least one of the base connecting part and the coil connecting part having a soldering part to be soldered to the base substrate or the coil substrate, the soldering part including a first connecting part and a second connecting part adjacent to the first connecting part, and, when a direction in which the first connecting part and the second connecting part are adjacent to each other is defined as an adjacent direction, a cross-section of the first connecting part orthogonal to the adjacent direction being smaller in area than a cross-section of the second connecting part orthogonal to the adjacent direction.

A beam having the above configuration is electrically and mechanically connected to a base substrate or coil substrate by soldering. In this case, the beam can be connected to the base substrate or the coil substrate in a shorter time and with sufficient strength, compared to the case where a beam is adhered to a substrate using a conductive adhesive as in the past.

Also, in the soldering part, a cross-section of the first connecting part orthogonal to the adjacent direction is smaller in area than a cross-section of the second connecting part orthogonal to the adjacent direction. By setting the cross-sectional areas of the first connecting part and the second connecting part as described above, unevenness can be formed in the soldering part. In the soldering part, a contact area between the solder and the soldering part can thereby be sufficiently secured. As a result, the soldering part can be more reliably connected to the base substrate or the coil substrate.

(2) The first connecting part may be smaller in thickness than the second connecting part. By changing the thickness of the first connecting part and the second connecting part in this way, the contact area between the solder and the soldering part can be easily increased.

(3) The first connecting part may be smaller in width than the second connecting part. By changing the width of the first connecting part and the second connecting part in this way, the contact area between the solder and the soldering part can be easily increased.

(4) The coil connecting part may include an extension part provided in a direction away from the beam part and the soldering part provided via the extension part. In this case, the soldering part can be soldered to the coil substrate at a position sufficiently distanced from the beam part. An excessive load can thereby be prevented from being applied to the connecting part between the soldering part and the coil substrate, when the coil substrate and the mirror swing.

(5) The first connecting part may be rougher in surface roughness than the second connecting part. In this case, on the surface of the first connecting part, the contact area with the solder can be sufficiently large. The first connecting part can thereby be more reliably soldered to the base substrate or the coil substrate.

(6) The first connecting part may be an etching part. For example, by forming the first connecting part by half-etching, the surface roughness of the first connecting part can be suitably roughened. Note that, in the present specification, the etching part means a portion formed by etching.

(7) The beam may be made of stainless steel. In this case, sufficient strength can be secured.

(8) A swinging element in one aspect of the present invention includes a movable part including a mirror that reflects light and a coil substrate, the above-described beam, a pair of which are provided to extend in opposite directions to each other from the coil substrate and support the coil substrate with the coil connecting part of each of the beams, a base substrate supporting the base connecting part of each of the beams, and a magnetic field forming part forming a magnetic field at a position of the coil substrate, the movable part swinging with the beam parts of the pair of beams as an axial center, due to a current being supplied from the base substrate to the coil substrate via the pair of beams.

With a swinging element having the above configuration, a Lorentz force can be generated by a current flowing through the coil substrate and a magnetic field formed by the magnetic field forming part, and the movable part can be swung with the beam parts of the pair of beams as the axial center. The mirror can thereby be swung.

(9) The mirror may be provided on one side in a thickness direction of the coil substrate, and the coil connecting part of each beam may be provided on the one side or an opposite side in the thickness direction of the coil substrate. In this case, swing of the coil substrate can be appropriately transmitted to the mirror, thus enabling the mirror to be appropriately swung.

(10) The coil substrate may have a notch part formed in a portion opposing the beam part of each of the pair of beams. According to this configuration, even if part of the beam part is positioned on one side of the coil substrate in the thickness direction of the coil substrate, contact between the coil substrate and the beam part can be prevented. In this case, the coil connecting part of one of the beams and the coil connecting part of the other beam can be brought sufficiently close together. As a result, miniaturization of the swinging element in the axial direction of the beams (length direction of the beam parts) is possible.

(11) An optical scanning apparatus according to one aspect of the present invention includes the above-described swinging element, and a light projecting unit configured to output measurement light toward the mirror of the swinging element.

In the optical scanning apparatus having the above configuration, measurement light reflected by the mirror can be scanned in a predetermined scanning range, by irradiating the mirror with measurement light from the light projecting unit while swinging the mirror in the swinging element.

Advantageous Effects of the Invention

According to the present invention, a beam can be fixed to a substrate in a short time and with sufficient strength.

MODE FOR CARRYING OUT THE INVENTION

Hereinafter, a beam according to an embodiment of the present invention, a swinging element provided with the beam, and an optical scanning apparatus will be described with reference to drawings.

Configuration of Optical Scanning Apparatus

Figure 1:
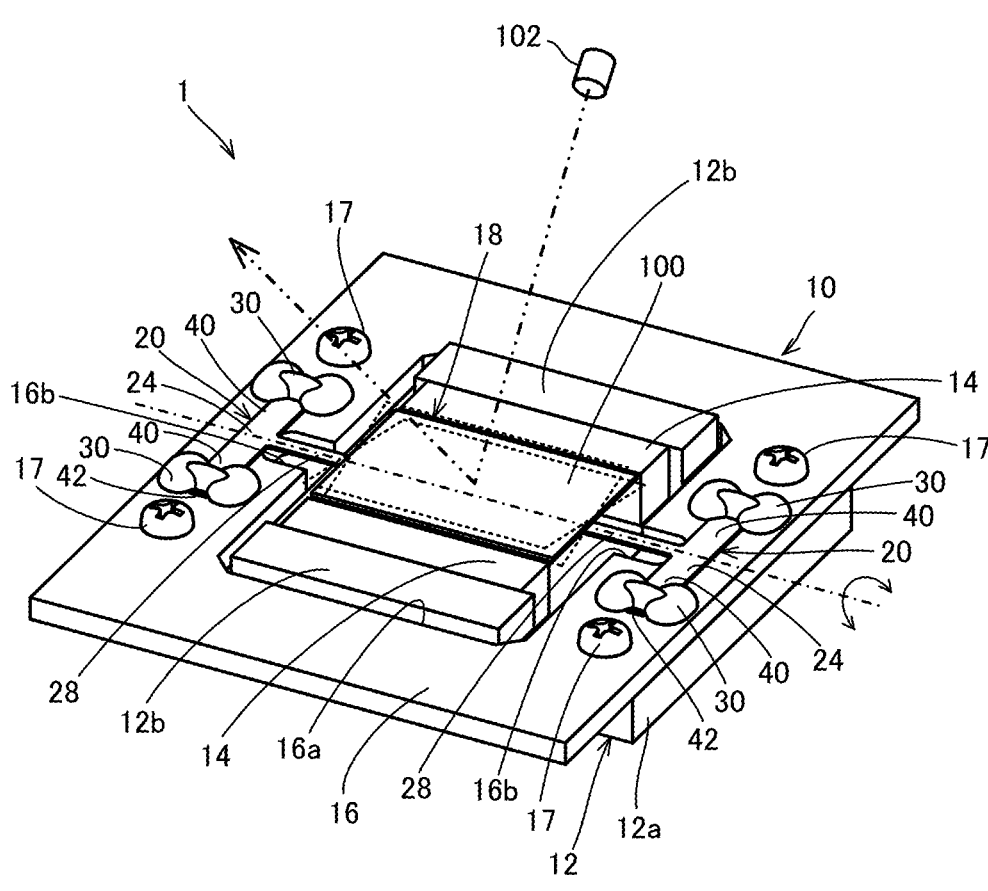
FIG. 1 is a schematic diagram showing an optical scanning apparatus according to one embodiment of the present invention.

FIG. 1 is a schematic diagram showing an optical scanning apparatus according to one embodiment of the present invention. As shown in FIG. 1, an optical scanning apparatus 1 includes a swinging element 10 that has a mirror 100 and a light projecting unit 102 that outputs measurement light (laser light, etc.) toward the mirror 100. The mirror 100 is provided in the swinging element 10 so as to be able to swing with beam parts 28 of beams 20 described later as the axial center. The light projecting unit 102 can be configured similarly to the light projecting unit of a known optical scanning apparatus, and includes a light emitting element such as a laser diode, for example.

In the optical scanning apparatus 1 according to the present embodiment, the direction of travel of measurement light reflected by the mirror 100 can be changed, by irradiating the mirror 100 with measurement light from the light projecting unit 102 while swinging the mirror 100 with the swinging element 10. The measurement light can thereby be deflected and scanned in a predetermined scanning range. Hereinafter, the swinging element 10 will be described.

Configuration of Swinging Element

Figure 2:
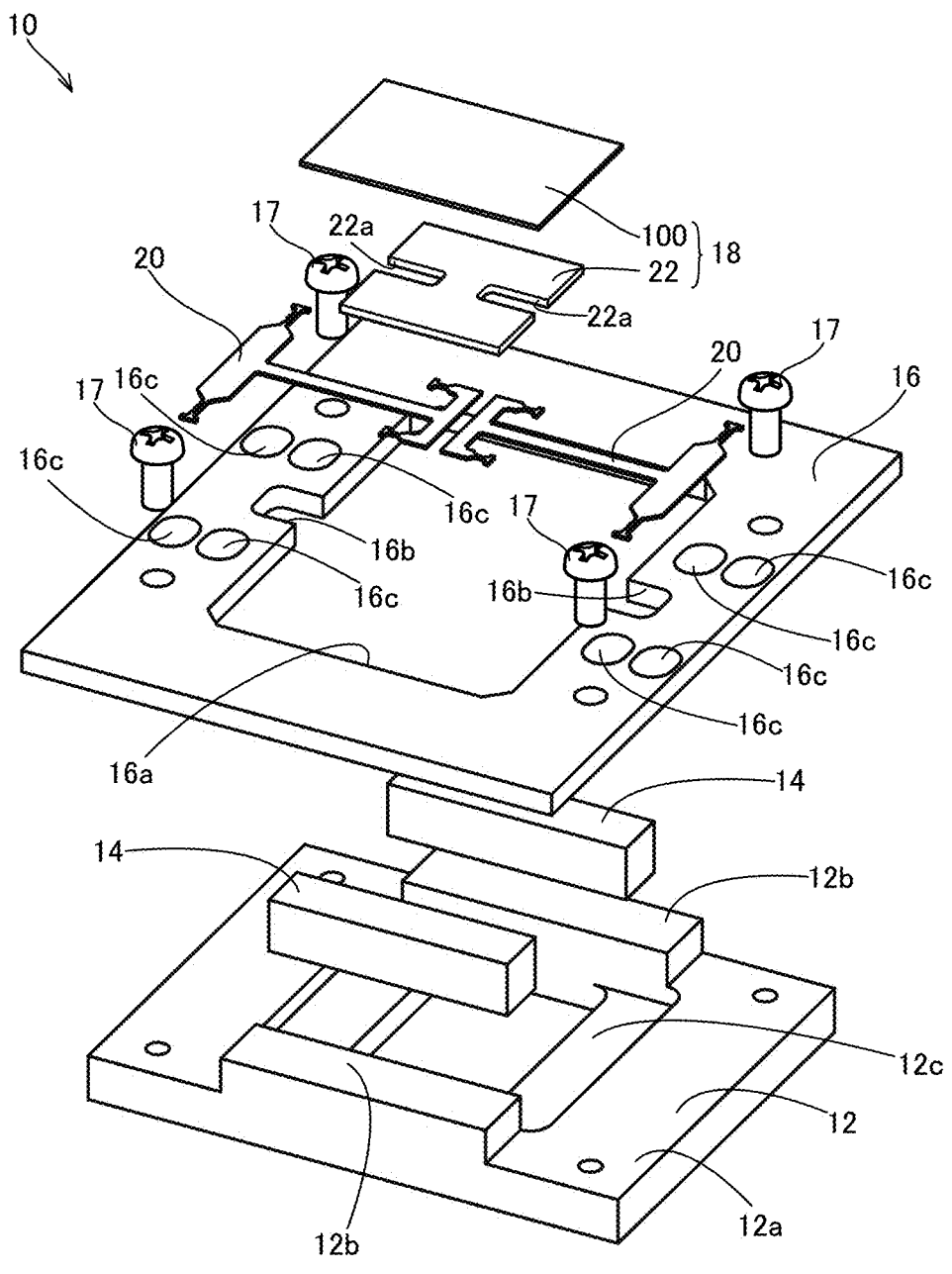
FIG. 2 is a diagram for describing the configuration of a swinging element.
Figure 3:
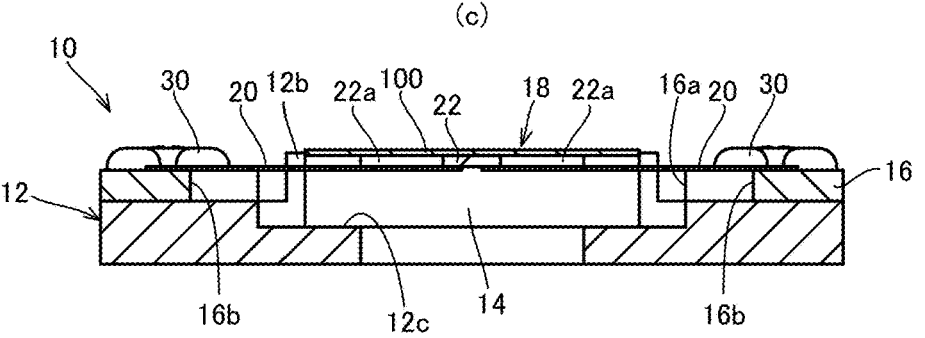
FIG. 3 are diagrams for describing the configuration of the swinging element.

FIGS. 2 and 3 are diagrams for describing the configuration of the swinging element 10. Specifically, FIG. 2 is an exploded perspective view showing the swinging element 10, FIG. 3(a) is a plan view showing the swinging element 10, FIG. 3 (b) is a cross-sectional view showing a B-B section of FIG. 3(a), and FIG. 3(c) is a cross-sectional view showing a C-C section of FIG. 3(a).

As shown in FIGS. 1 to 3, the swinging element 10 includes a yoke 12, a pair of permanent magnets 14 supported by the yoke 12, a base substrate 16 supported by the yoke 12, a movable part 18 provided in a central portion of the base substrate 16, and a pair of beams 20 connected to the base substrate 16 and supporting the movable part 18. The movable part 18 includes a coil substrate 22 and the mirror 100.

As shown in FIGS. 2 and 3, in the present embodiment, the yoke 12 has a plate-shaped part 12a and a pair of protruding parts 12b protruding upward from the plate-shaped part 12a. In a central portion of the plate-shaped part 12a, a recessed part 12c is formed between the pair of protruding parts 12b. In the present embodiment, the pair of permanent magnets 14 each have a rectangular parallelepiped shape. The pair of permanent magnets 14 are held in the recessed part 12c of the yoke 12. In the present embodiment, the yoke 12 and the pair of permanent magnets 14 function as a magnetic field forming part and form a magnetic field in a space that includes the coil substrate 22. In other words, the yoke 12 and the pair of permanent magnets 14 form a magnetic field at the position of the coil substrate 22.

The base substrate 16 is made of a resin material, for example. The base substrate 16 may be a single-layer substrate or a multilayer substrate. In the present embodiment, the base substrate 16 is fixed to the yoke 12 by a plurality of screws 17.

A through hole 16a is formed in a central portion of the base substrate 16. The pair of protruding parts 12b of the yoke 12 and the pair of permanent magnets 14 are disposed within the through hole 16a. A pair of notch parts 16b are formed in an edge portion of the through hole 16a. The pair of notch parts 16b are formed in a portion of the base substrate 16 that opposes the beam parts 28 (see FIG. 1) described later.

As shown in FIG. 2, a plurality of lands 16c are formed on an upper surface of the base substrate 16. As will be described later, base connecting parts 24 of the beams 20 (see FIG. 3(a)) are connected to the lands 16c. In the present embodiment, each beam 20 need only be electrically connected to wiring (not shown) formed on the base substrate 16 via one of the lands 16c. Accordingly, a predetermined number of the plurality of lands 16c may not be electrically connected to the wiring formed on the base substrate 16.

As shown in FIGS. 1 and 3, the movable part 18 and the pair of beams 20 are provided so as to cross a central portion of the through hole 16a in the base substrate 16. In the present embodiment, the movable part 18 is provided in a central portion of the through hole 16a so as to be located between the pair of permanent magnets 14 in plan view. Also, the movable part 18 is supported by the base substrate 16 via the pair of beams 20. The pair of beams 20 are provided to extend from the movable part 18 (coil substrate 22) in opposite directions to each other in a direction orthogonal to the thickness direction of the coil substrate 22. In other words, the pair of beams 20 are provided to extend in opposite directions to each other from the coil substrate 22, when viewed from a winding axis direction of a pattern coil (not shown) described later which is formed on the coil substrate 22. Note that, in the present embodiment, the winding axis direction of the coil substrate 22 is a direction parallel to the thickness direction of the coil substrate 22.

Figure 4:
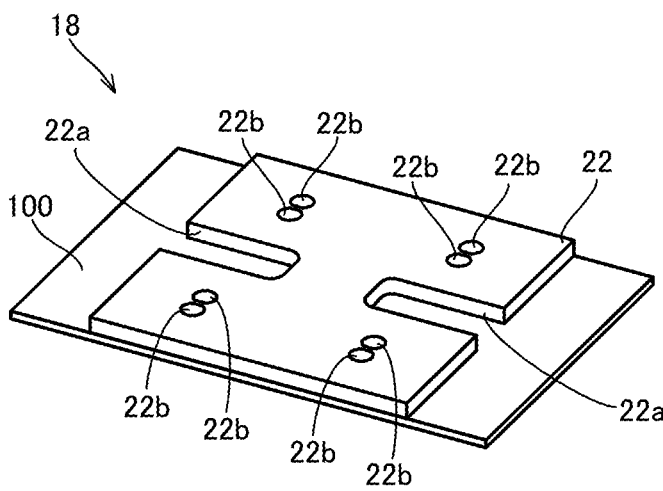
FIG. 4 is a perspective view of a movable part viewed from the back surface side (opposite side to FIG. 1).

FIG. 4 is a perspective view of the movable part 18 viewed from the back surface side (opposite side to FIG. 1). The coil substrate 22 is made of a resin material, for example. The coil substrate 22 may be a single-layer substrate or a multilayer substrate. In the present embodiment, the mirror 100 is fixed to the surface of the coil substrate 22. In the present embodiment, the mirror 100 is fixed to the surface of the coil substrate 22 by an adhesive or screws, for example.

As shown in FIGS. 2 and 4, a pair of notch parts 22a are formed in the outer edge of the coil substrate 22. The pair of notch parts 22a are formed in a portion that opposes the beam parts 28 (see FIG. 1) described later.

Although not illustrated, a pattern coil is formed on the coil substrate 22. As shown in FIG. 4, a plurality of lands 22b are formed on the back surface of the coil substrate 22. As will be described later, coil connecting parts 26 of the beams 20 (see FIG. 6) are connected to the lands 22b. In the present embodiment, one of the beams 20 is electrically connected to one end of the pattern coil, and the other beam 20 is electrically connected to the opposite end of the pattern coil. Accordingly, a predetermined number of the plurality of lands 22b may not be electrically connected to the pattern coil formed in the coil substrate 22.

Figure 5:
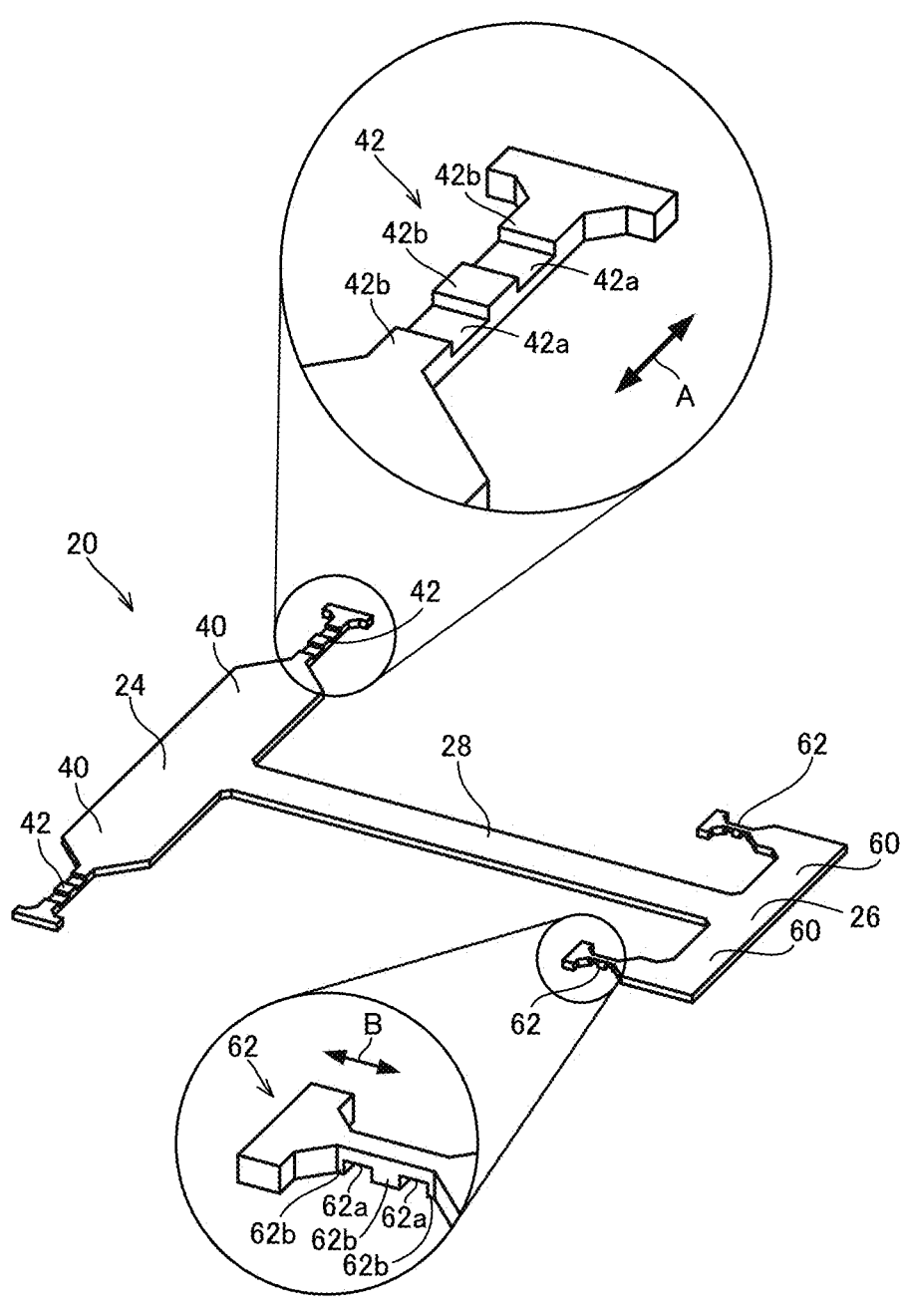
FIG. 5 is a perspective view showing a beam.

FIG. 5 is a perspective view showing one of the beams 20. The beams 20 are made of a metal material such as stainless steel, for example. Note that the material of the beams 20 is preferably a non-magnetic material.

The beams 20 each include a base connecting part 24, a coil connecting part 26, and a beam part 28 that couples the base connecting part 24 to the coil connecting part 26. In the present embodiment, the base connecting part 24, the coil connecting part 26, and the beam part 28 are each formed in a plate shape. Also, the beam part 28 has an elongated shape.

The base connecting part 24 includes an extension part 40 and a soldering part 42. The extension part 40 is provided to extend away from the beam part 28. In the present embodiment, the base connecting part 24 has a pair of extension parts 40 and a pair of soldering parts 42. Each of the pair of extension parts 40 is provided to extend away from the beam part 28. In the present embodiment, the pair of extension parts 40 are provided to extend away from each other in a direction orthogonal to the length direction of the beam parts 28.

The soldering part 42 is provided at a distal end portion of each extension part 40. The soldering parts 42 each have a first connecting part 42a and a second connecting part 42b provided to be aligned in one direction. In the present embodiment, the soldering parts 42 each have a plurality of first connecting parts 42a and a plurality of second connecting parts 42b. In the present embodiment, each first connecting part 42a is provided to be sandwiched between a pair of second connecting parts 42b.

When a direction in which the first connecting parts 42a and the second connecting parts 42b are adjacent to each other is defined as an adjacent direction A, a cross-section of each first connecting part 42a orthogonal to the adjacent direction A is smaller in area than a cross-section of each second connecting part 42b orthogonal to the adjacent direction A. In the present embodiment, the first connecting parts 42a are smaller in thickness than the second connecting parts 42b. Also, in the present embodiment, the first connecting parts 42a and the second connecting parts 42b are formed such that one of the surfaces in the thickness direction of the soldering part 42 is a flat surface and the other surface is an uneven surface.

Note that, in the present embodiment, the first connecting parts 42a and the second connecting parts 42b are substantially equal in width. In the present specification, the width direction of the soldering parts 42 (width direction of first connecting parts 42a and second connecting parts 42b) means a direction orthogonal to the thickness direction of the soldering parts 42 and the adjacent direction A.

The coil connecting part 26 has an extension part 60 and a soldering part 62. The extension part 60 is provided to extend away from the beam part 28. In the present embodiment, the coil connecting part 26 has a pair of extension parts 60 and a pair of soldering parts 62. Each of the pair of extension parts 60 is provided to extend away from the beam part 28. In the present embodiment, the pair of extension parts 60 are provided to extend away from each other in a direction orthogonal to the length direction of the beam parts 28.

The soldering part 62 is provided at a distal end portion of each extension part 60. In the present embodiment, the soldering part 62 is provided to extend from the distal end portion of each extension part 60 toward the base connecting part 24 side. The soldering parts 62 each have a first connecting part 62a and a second connecting part 62b provided to be aligned in one direction. In the present embodiment, the soldering parts 62 each have a plurality of first connecting parts 62a and a plurality of second connecting parts 62b. In the present embodiment, each first connecting part 62*a* is provided to be sandwiched between a pair of second connecting parts 62*b*.

When a direction in which the first connecting parts 62*a* and the second connecting parts 62*b* are adjacent to each other is defined as an adjacent direction B, a cross-section of each first connecting part 62*a* orthogonal to the adjacent direction B is smaller in area than a cross-section of each second connecting part 62*b* orthogonal to the adjacent direction B. In the present embodiment, the first connecting parts 62*a* are smaller in thickness than the second connecting parts 62*b*. In the present embodiment, the first connecting parts 62*a* and the second connecting parts 62*b* are formed such that one surface in the thickness direction of the soldering part 62 is a flat surface and the other surface is an uneven surface. Note that, in the present embodiment, the soldering parts 42 and 62 are formed such that the uneven surface of the soldering parts 42 faces one side and the uneven surface of the soldering parts 62 faces the opposite side, in the thickness direction of the beams 20.

Note that, in the present embodiment, the first connecting parts 62*a* and the second connecting parts 62*b* are substantially equal in width. Herein, the width direction of the soldering parts 62 (width direction of first connecting parts 62*a* and second connecting parts 62*b*) means a direction orthogonal to the thickness direction of the soldering parts 62 and the adjacent direction B.

Although not described in detail, the beams 20 can be manufactured from a metal plate having a predetermined thickness using an etching method, for example. Also, the first connecting parts 42*a* and 62*a* can be formed by half-etching, for example. In this case, the first connecting parts 42*a* are rougher in surface roughness than the second connecting parts 42*b*. Similarly, the first connecting parts 62*a* are rougher in surface roughness than the second connecting parts 62*b*. Note that the surface roughness of the soldering parts 42 and 62 means the roughness of the portion of the soldering parts 42 and 62 that forms the uneven surface. In the present embodiment, surface roughness means a maximum height Rz (JIS B0651: 2001) measured with the measuring force set to 0.75 mN, using a stylus having a tip radius of 2 μm.

As shown in FIGS. 1 and 3, the base connecting part 24 of each beam 20 is connected to the base substrate 16 by solder 30. In the present embodiment, when connecting the base connecting part 24 to the base substrate 16, each soldering part 42 is disposed between a pair of lands 16*c* (see FIG. 2), such that the flat surface of the soldering part 42 faces the base substrate 16 side. In that state, the soldering parts 42 are soldered to the pairs of lands 16*c*. The beams 20 are thereby mechanically and electrically connected to the base substrate 16. In the present embodiment, the solder 30 is provided so as to straddle the soldering parts 42. That is, the solder 30 mechanically and electrically connects the beams 20 (soldering parts 42) to the base substrate 16, so as to bridge paired lands 16*c* that are adjacent to each other across the soldering parts 42.

Figure 6:
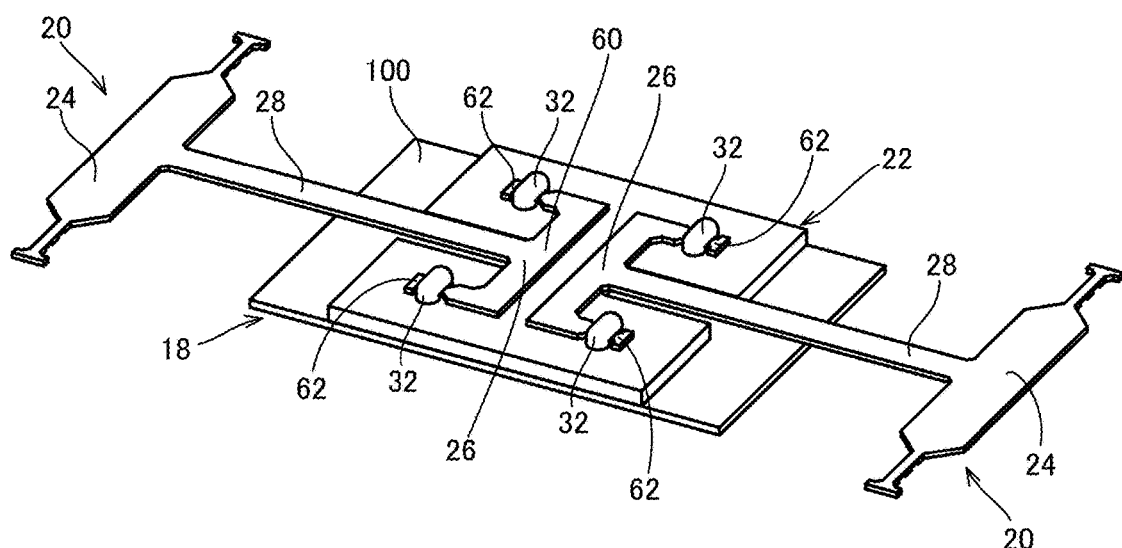
FIG. 6 is a perspective view of the movable part and beams viewed from the back surface side (opposite side to FIG. 1).

FIG. 6 is a perspective view of the movable part 18 and the beams 20 viewed from the back surface side (opposite side to FIG. 1). As shown in FIG. 6, the coil connecting part 26 of each beam 20 is connected to the coil substrate 22 by solder 32. In the present embodiment, when connecting the coil connecting part 26 to the coil substrate 22, each soldering part 62 is disposed between a pair of lands 22*b* (see FIG. 4) such that the flat surface of the soldering part 62 faces the coil substrate 22 side. In that state, the soldering parts 62 are soldered to the pairs of lands 22*b*. The beams 20 are thereby mechanically and electrically connected to the coil substrate 22. In the present embodiment, the solder 32 is provided so as to straddle the soldering parts 62. That is, the solder 32 mechanically and electrically connects the beams 20 (soldering parts 62) to the coil substrate 22 so as to bridge paired lands 22*b* that are adjacent to each other across the soldering parts 62.

As a result of adopting the above configuration, the movable part 18 is supported by the base substrate 16 via the pair of beams 20, as shown in FIG. 1. In the present embodiment, an AC power source (not shown) is connected to the base substrate 16, and an alternating current is supplied from the AC power source to the pattern coil (not shown) of the coil substrate 22 (see FIG. 2), via wiring formed on the base substrate 16 and the pair of beams 20. At this time, a Lorentz force is generated by the current that flows through the pattern coil and the magnetic field formed by the yoke 12 and the pair of permanent magnets 14, and the movable part 18 swings with the beam parts 28 as the axial center.

Effects of Example Embodiment

In the present embodiment, as described above, the beams 20 are electrically and mechanically connected to the base substrate 16 and the coil substrate 22 by being soldered. In this case, the beams 20 can be connected to the base substrate 16 and the coil substrate 22 in a short time and with sufficient strength, compared to the case where the beams are adhered to the substrate using a conductive adhesive as in the past.

Also, in the present embodiment, in the soldering parts 62, a cross-section of the first connecting parts 62*a* orthogonal to the adjacent direction B is smaller in area than a cross-section of the second connecting parts 62*b* orthogonal to the adjacent direction B. By setting the cross-sectional areas of the first connecting parts 62*a* and the second connecting parts 62*b* as described above, an uneven surface can be formed on the surface of the soldering parts 62. In the soldering parts 62, the contact area between the solders 32 and the soldering parts 62 can thereby be sufficiently secured. As a result, the soldering parts 62 can be more reliably connected to the coil substrate 22. This similarly applies to the soldering parts 42.

Also, in the present embodiment, the first connecting parts 62*a* are rougher in surface roughness than the second connecting parts 62*b*. The contact area with the solder 32 can thereby be sufficiently increased on the surface of the first connecting parts 62*a* which form the recessed parts. As a result, the first connecting parts 62*a* can be more reliably soldered to the coil substrate 22. This similarly applies to the first connecting parts 42*a* of the soldering parts 42.

Also, in the present embodiment, the extension parts 60 are provided to extend away from the beam part 28, and the soldering parts 62 are provided at the distal end portions of the extension parts 60. The soldering parts 62 can thereby be soldered to the coil substrate 22 at positions sufficiently distanced from the beam parts 28. In this case, when the movable part 18 swings, it is possible to prevent an excessive load from being applied to the connecting parts between the soldering parts 62 and the coil substrate 22. This similarly applies to the connecting parts between the soldering parts 42 and the base substrate 16.

Also, in the present embodiment, the notch parts 22*a* are formed in portions of the coil substrate 22 that oppose beam parts 28 of the beams 20. Contact between the coil substrate 22 and the beam parts 28 can thereby be prevented, even if part of the beam parts 28 is positioned on one side of the coil substrate 22 in the thickness direction of the coil substrate 22. In this case, the coil connecting part 26 of one of the beams 20 and the coil connecting part 26 of the other beam 20 can be brought sufficiently close together. As a result, miniaturization of the swinging element 10 (optical scanning apparatus 1) in the axial direction of the beams 20 (length direction of the beam parts 28) is possible.

Similarly, the notch parts 16b are formed in portions of the base substrate 16 that oppose the beam parts 28 of the beams 20. Contact between the base substrate 16 and the beam parts 28 can thereby be prevented, even if part of beam parts 28 is positioned on one side of the base substrate 16 in the thickness direction of the base substrate 16. In this case, a region necessary for forming the lands 16c of sufficient length or a region for forming holes for the screws 17 can be sufficiently secured in the base substrate 16 even without extending the base substrate 16 in the axial direction of the beams 20 (length direction of the beam parts 28). As a result, miniaturization of the swinging element 10 (optical scanning apparatus 1) in the axial direction of the beams 20 (length direction of the beam parts 28) is possible.

In the present embodiment, the soldering parts 62 are provided to extend from the distal end portions of the extension parts 60 toward the base connecting part 24 side. In this case, contact between the solder 32 for connecting one of the beams 20 to the coil substrate 22 and the solder 32 for connecting the other beam 20 to the coil substrate 22 can be reliably prevented. One beam 20 and the other beam 20 being directly connected due to the solder 32 can thereby be sufficiently prevented, even if the distal end portions of the beam parts 28 of the pair of beams 20 are brought close together. As a result, it is possible to sufficiently increase the length of the beam parts 28 without increasing the length of the swinging element 10 (optical scanning apparatus 1) in the axial direction of the beams 20 (length direction of the beam parts 28).

Other Embodiments

Figure 7:
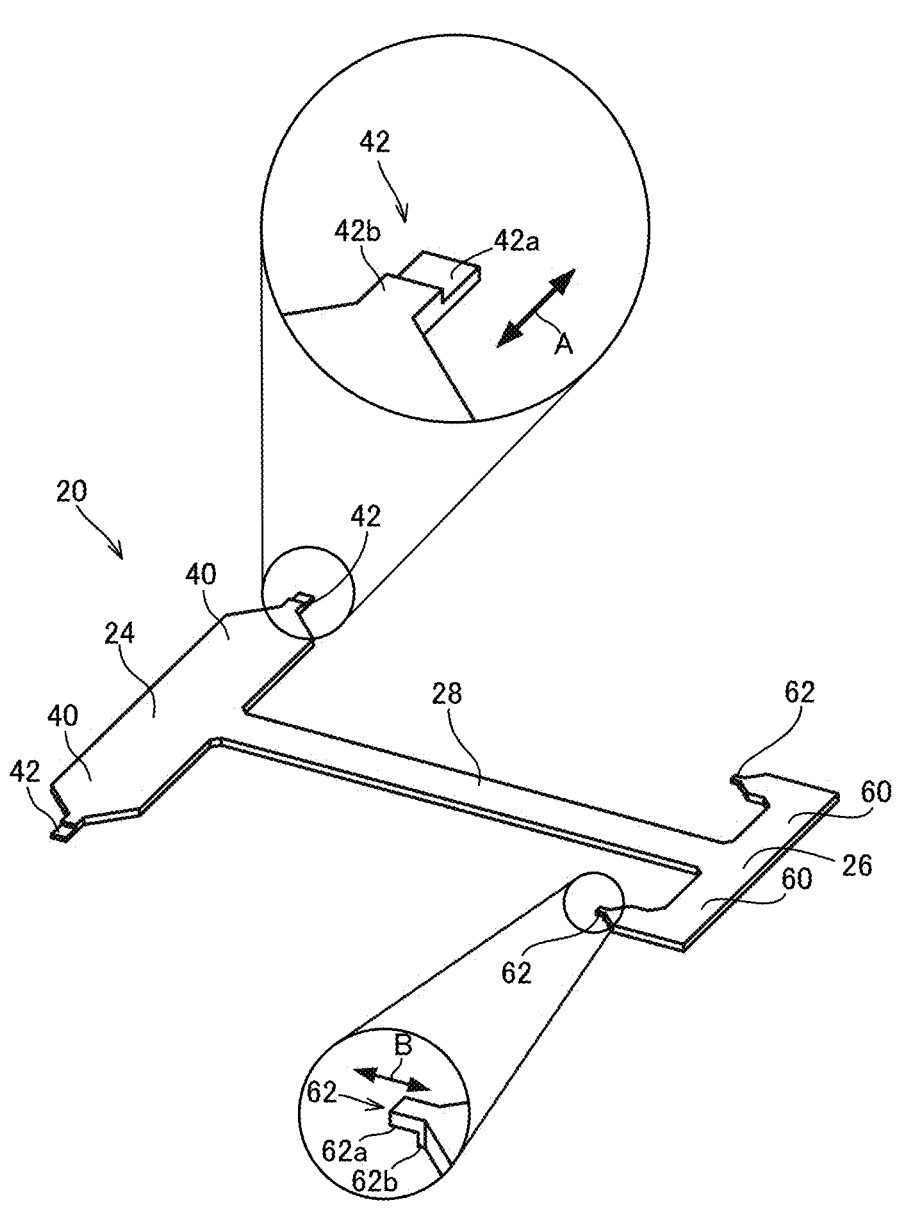
FIG. 7 is a perspective view showing another example of the beam.

In the above-described embodiment, a plurality of first connecting parts 42a and a plurality of second connecting parts 42b are provided to be arranged alternately, and a plurality of first connecting parts 62a and a plurality of second connecting parts 62b are provided to be arranged alternately. However, as shown in FIG. 7, in each soldering part 42, at least one first connecting part 42a and one second connecting part 42b need only be provided to be adjacent to each other. Similarly, in each soldering part 62, at least one first connecting part 62a and one second connecting part 62b need only be provided to be adjacent to each other.

In the above-described embodiment, the first connecting parts 42a and the second connecting parts 42b are substantially equal in width, and the first connecting parts 62a and the second connecting parts 62b are substantially equal in width. However, the first connecting parts 42a may be smaller in width than the second connecting parts 42b. In this case, the first connecting parts 42a and the second connecting parts 42b may be substantially equal in thickness. Also, the first connecting parts 62a may be smaller in width than the second connecting parts 62b. In this case, the first connecting parts 62a and the second connecting parts 62b may be substantially equal in thickness.

Figure 8:
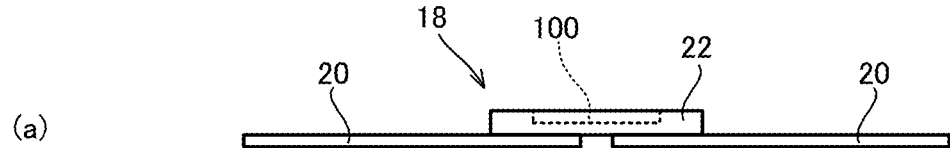
FIG. 8 are diagrams showing other example dispositions of the beams, coil substrate, and mirror.
Figure 8:
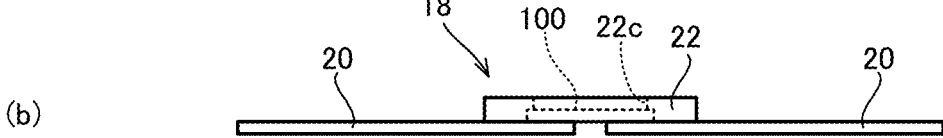
Figure 8:
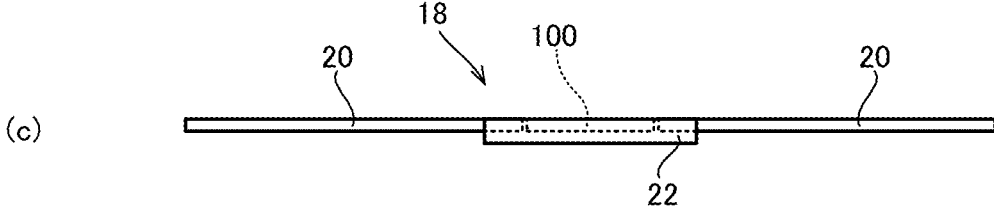
Figure 8:
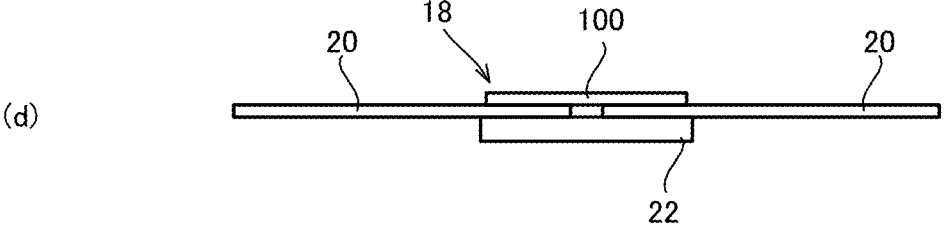

In the above-described embodiment, the pair of beams 20 are connected to the surface on one side in the thickness direction of the coil substrate 22, and the mirror 100 is provided so as to cover the surface on the opposite side in the thickness direction of the coil substrate 22, but positional relationship of the beams 20, the coil substrate 22, and the mirror 100 is not limited to the above-described example. FIG. 8 is a diagram illustrating other example dispositions of the beams 20, the coil substrate 22, and the mirror 100.

For example, as shown in FIG. 8(a), the pair of beams 20 may be connected to the surface on one side of the coil substrate 22, and the mirror 100 may be held by the coil substrate 22, such that the surface on the opposite side of the coil substrate 22 and the reflective surface of the mirror 100 are substantially flush with each other. Also, as shown in FIG. 8(b), the mirror 100 may be provided to be sandwiched between the beams 20 and the coil substrate 22. In this case, for example, a through hole 22c for exposing the mirror 100 is formed in the coil substrate 22.

Also, for example, as shown in FIGS. 8(c) and (d), the pair of beams 20 and the mirror 100 may be provided on one side in the thickness direction of the coil substrate 22. Note that, in the example shown in FIG. 8(c), the pair of beams 20 and the mirror 100 are connected to each other on one side in the thickness direction of the coil substrate 22, such that the surface of the beams 20, the surface of the coil substrate 22, and the reflective surface of the mirror 100 are substantially flush with each other. Also, in the example shown in FIG. 8(d), the pair of beams 20 may be sandwiched between the coil substrate 22 and the mirror 100.

In the above-described embodiment, the case where the swinging element 10 includes the mirror 100 as a separate member from the beams 20 or the coil substrate 22 is described, but the mirror may be formed integrally with the beams 20, by performing plating, vapor deposition, mirror finishing or the like on the beams 20. Similarly, the mirror may be integrally formed with the coil substrate 22.

In the above-described embodiment, the case where the base connecting parts 24 are soldered to the base substrate 16 and the coil connecting parts 26 are soldered to the coil substrate 22 is described, but one of the base connecting parts 24 and the coil connecting parts 26 may be connected to the substrate by an adhesive, rather than soldering.

LIST OF REFERENCE SIGNS

1 Optical scanning apparatus
10 Swinging element
12 Yoke
14 Permanent magnet
16 Base substrate
18 Movable part
20 Beam
22 Coil substrate
22a Notch part
24 Base connecting part
26 Coil connecting part
28 Beam part
30, 32 Solder
40, 60 Extension part
42,62 Soldering part
42a, 62a First connecting part
42b, 62b Second connecting part
100 Mirror
102 Light projecting unit

The invention claimed is:
1. A beam for connecting a base substrate and a coil substrate to each other and supplying a current for swinging the coil substrate from the base substrate to the coil substrate in a swinging element for swinging a mirror that reflects light in an optical scanning apparatus, the beam comprising:

a base connecting part to be connected to the base substrate;

a coil connecting part to be connected to the coil substrate; and a beam part coupling the base connecting part to the coil connecting part, wherein at least one of the base connecting part and the coil connecting part has a soldering part to be soldered to the base substrate or the coil substrate, the soldering part includes a first connecting part and a second connecting part adjacent to the first connecting part, and when a direction in which the first connecting part and the second connecting part are adjacent to each other is defined as an adjacent direction, a cross-section of the first connecting part orthogonal to the adjacent direction is smaller in area than a cross-section of the second connecting part orthogonal to the adjacent direction.

2. The beam according to claim 1, wherein the first connecting part is smaller in thickness than the second connecting part.

3. The beam according to claim 1, wherein the first connecting part is smaller in width than the second connecting part.

4. The beam according to claim 1, wherein the coil connecting part includes:

an extension part provided in a direction away from the beam part; and the soldering part provided via the extension part.

5. The beam according to claim 1, wherein the first connecting part is rougher in surface roughness than the second connecting part.

6. The beam according to claim 1, wherein the first connecting part is an etching part.

7. The beam according to claim 1 is made of stainless steel.

8. A swinging element comprising:

a movable part including a mirror that reflects light and a coil substrate;

the beam according to claim 1, a pair of which are provided to extend in opposite directions to each other from the coil substrate and support the coil substrate with the coil connecting part of each of the beams;

a base substrate supporting the base connecting part of each of the beams; and a magnetic field forming part forming a magnetic field at a position of the coil substrate, wherein the movable part swings with the beam parts of the pair of beams as an axial center, due to a current being supplied from the base substrate to the coil substrate via the pair of beams.

9. The swinging element according to claim 8, wherein the mirror is provided on one side in a thickness direction of the coil substrate, and the coil connecting part of each beam is provided on the one side or an opposite side in the thickness direction of the coil substrate.

10. The swinging element according to claim 8, wherein the coil substrate has a notch part formed in a portion opposing the beam part of each of the pair of beams.

11. An optical scanning apparatus comprising:

the swinging element according to claim 8; and a light projecting unit configured to output measurement light toward the mirror of the swinging element.

\*  \*  \*  \*  \*